(12) United States Patent
Park et al.

(10) Patent No.: US 7,133,384 B2
(45) Date of Patent: Nov. 7, 2006

(54) METHOD FOR SUPPORTING HAND-OFF DECISION FOR GUARANTEEING MOBILITY OF A DUAL-MODE MOBILE TERMINAL BETWEEN DIFFERENT MOBILE COMMUNICATION NETWORK SYSTEMS

(75) Inventors: Seong Soo Park, Seoul (KR); In Hong Lee, Kyunggi-do (KR); Jin Ick Lee, Kyunggi-do (KR)

(73) Assignee: SK Telecom Co., Ltd., Seoul (KR)

( * ) Notice: Subject to any disclaimer, the term of this patent is extended or adjusted under 35 U.S.C. 154(b) by 847 days.

(21) Appl. No.: 10/004,854

(22) Filed: Dec. 7, 2001

(65) Prior Publication Data

US 2002/0071404 A1 Jun. 13, 2002

(30) Foreign Application Priority Data

Dec. 7, 2000 (KR) .............................. 2000-74369

(51) Int. Cl.
*H04Q 7/00* (2006.01)
*H04B 7/216* (2006.01)
*H04Q 7/24* (2006.01)

(52) U.S. Cl. ..................... 370/331; 370/335; 370/342
(58) Field of Classification Search ................. 370/331
See application file for complete search history.

(56) References Cited

U.S. PATENT DOCUMENTS

| | | | | |
|---|---|---|---|---|
| 5,924,026 A * | 7/1999 | Krishnan | ................. | 455/414.1 |
| 6,246,673 B1 * | 6/2001 | Tiedemann et al. | .......... | 370/333 |
| 6,591,116 B1 * | 7/2003 | Laurila et al. | ............... | 455/558 |
| 6,704,581 B1 * | 3/2004 | Park et al. | ................ | 455/553.1 |
| 6,724,739 B1 * | 4/2004 | Tiedemann et al. | .......... | 370/331 |
| 6,741,578 B1 * | 5/2004 | Moon et al. | ................. | 370/335 |
| 6,741,868 B1 * | 5/2004 | Park et al. | ................ | 455/552.1 |
| 6,771,964 B1 * | 8/2004 | Einola et al. | ................ | 455/437 |
| 6,782,274 B1 * | 8/2004 | Park et al. | ................ | 455/552.1 |
| 6,853,852 B1 * | 2/2005 | Park et al. | ................... | 455/561 |
| 2001/0021179 A1 * | 9/2001 | Tiedemann et al. | .......... | 370/333 |
| 2002/0071480 A1 * | 6/2002 | Marjelund et al. | ........... | 375/141 |
| 2004/0213164 A1 * | 10/2004 | Park et al. | ................... | 370/252 |
| 2005/0048969 A1 * | 3/2005 | Shaheen et al. | .......... | 455/426.1 |

* cited by examiner

*Primary Examiner*—Chirag Shah
(74) *Attorney, Agent, or Firm*—Mayer, Brown, Rowe & Maw LLP

(57) ABSTRACT

The present invention relates to a method of supporting proper hand-off of a dual-mode mobile terminal based on terminal capability and communication status to guarantee continuous mobility in a mixed communication network where a synchronous and an asynchronous network system coexist. According to the present invention, a dual-mode terminal transmits information of its terminal capability operable in both the synchronous and the asynchronous network system to the mixed communication network, irrespective of which network system a present service area belongs to, then the mixed communication network constructs information on adjacent cells, which are selectively included based on the received terminal capability information, of the other network system and provides the dual-mode terminal with the constructed adjacent cell information.

15 Claims, 3 Drawing Sheets

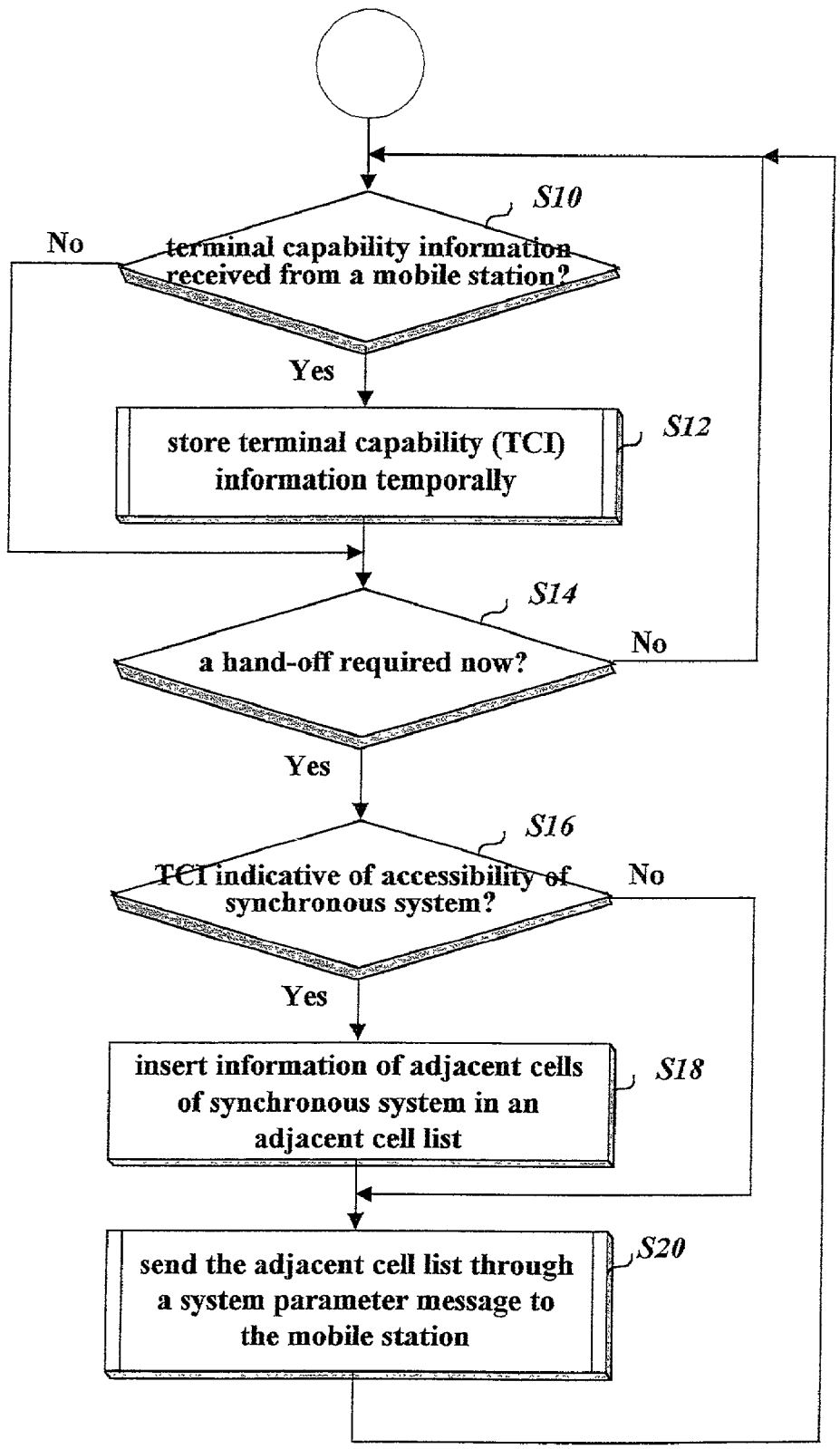

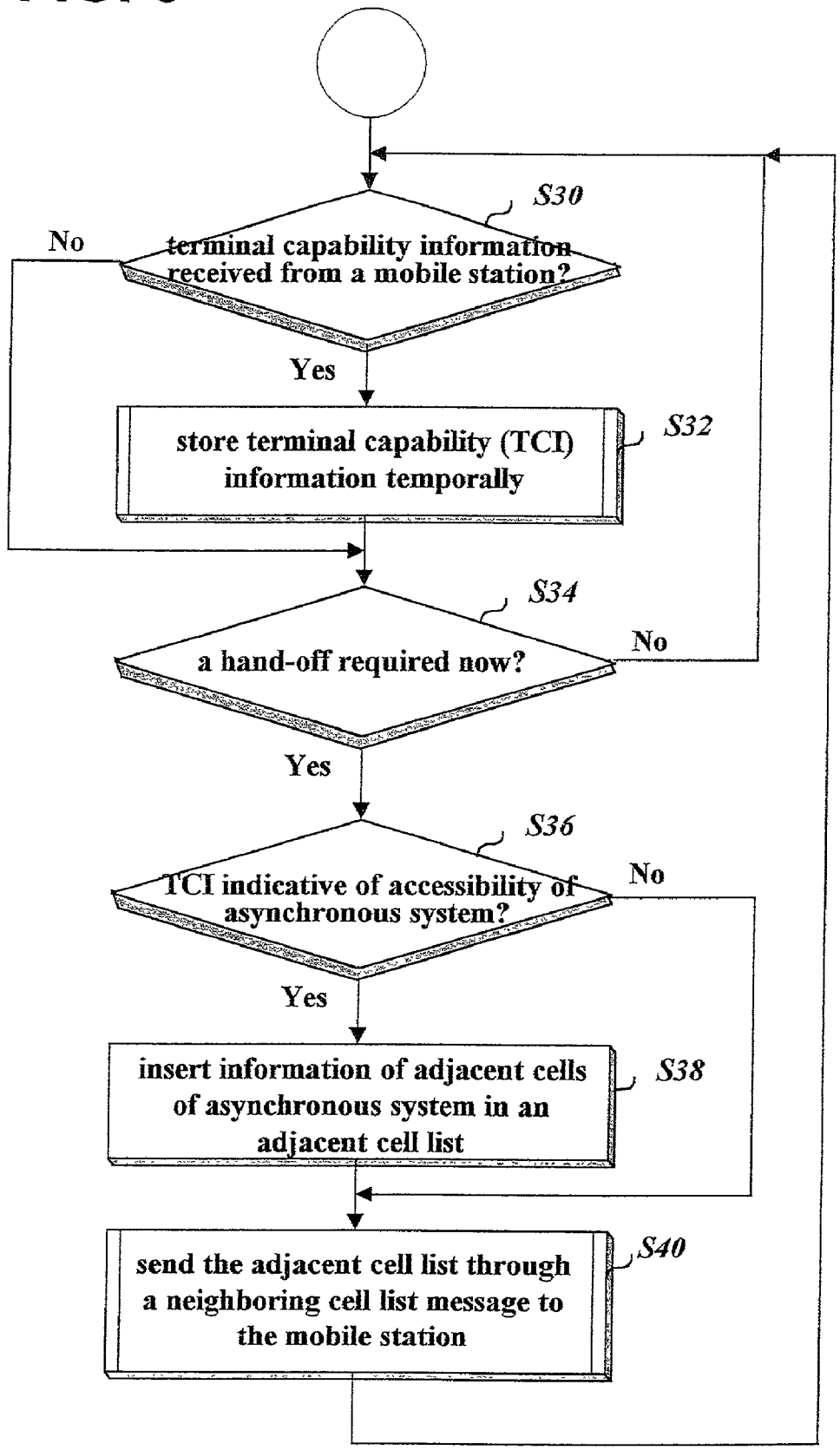

METHOD FOR SUPPORTING HAND-OFF DECISION FOR GUARANTEEING MOBILITY OF A DUAL-MODE MOBILE TERMINAL BETWEEN DIFFERENT MOBILE COMMUNICATION NETWORK SYSTEMS

BACKGROUND OF THE INVENTION

1. Field of the Invention

The present invention relates to a method of supporting hand-off decision for guaranteeing continuous mobility of a dual-mode mobile terminal between a plurality of different mobile communication network systems, more particularly, to a method of supporting hand-off decision of a dual-mode mobile station in a mixed communication network where a synchronous and an asynchronous communication system coexist when the dual-mode mobile station is about to move to other areas being serviced by different network system.

2. Description of the Related Art

According to development of mobile communication technologies and mobile networks, various mobile communication network systems are being developed and works on standardization thereof are in progress.

The mobile network system having been developed from a mobile phone network is bisected into a synchronous system based on IS-95 led by US at present and the asynchronous GSM system developed by ETSI, which is a key leader. Especially, the worldwide market share of the asynchronous system has reached over 80 percent.

In present, IMT-2000, the 3rd generation (called '3G' hereinafter) mobile communication system, is being standardized, and the system and radio frequency thereof are being designed to support global international roaming service. However, it is unlikely possible to derive mutually-agreed standard and system specification among related nations due to their own interests. Namely, standardization and development of IMT-2000 are in progress independently at two parties, one for W-CDMA system led by Japan and Europe, and the other for IS-2000 system led by US.

In Korea, the existing 2nd generation (called '2G' hereinafter) mobile phone system, which is commercially in service, is synchronous one, and commercialization of CDMA 2000 system, which is the earliest system of IMT-2000, is being promoted.

Service providers, however, want to use asynchronous W-CDMA as 3G system on the grounds that the 3G system is likely to adopt the W-CDMA system, therefore, a synchronous and an asynchronous system will coexist in Korea when the 3G system is introduced commercially.

If the present 2G mobile communication providers are chosen to the 3G mobile communication provider too, there will be occurred a hand-off problem between an asynchronous and a synchronous system when supporting mobility between two different systems.

The asynchronous and the synchronous network system have different channel structure and service capability each other, therefore, a hand-off between two different systems should be conducted after checking service access capability, namely, terminal capability of a mobile station.

Most previous researches on hand-off is focused on sync acquisition which is indispensable in case of a hand-off from the asynchronous to the synchronous system, and user data and service capability are hardly considered in the previous researches.

It is very important to support a hand-off between an old and a new network system from the standpoints of initial investment cost and recycling of already-installed system resources if most of the 2G mobile communication providers are decided to the 3G mobile communication providers, too. The synchronous and the asynchronous system are operated in accordance with mutually different protocol structure and procedure. Accordingly, for supporting smooth hand-off between the two different systems, there should be proposed a new method of determining a hand-off without affecting the existing procedures.

In communication circumstance of Korea running synchronous 2G system, an adoption of IMT-2000 of asynchronous system would cause several problems against efficient service.

First of all, apart from the existing network resources, a new mobile communication resources are needed to be constructed to introduce an asynchronous system, which requires enormous initial investment cost and very long network establishing time.

Furthermore, a new solution is needed for effective use of both the existing 2G system and the new 3G one. The solution considered in general is to install and start the asynchronous 3G system in part from heavy-traffic service territories, and to expand 3G service territories gradually. By doing this, the existing 2G system may be used as a supplementary network out of service coverage of the 3G system until the 3G system covers entirely.

For this gradual expansion of the 3G system, a new method of supporting a hand-off between the two different systems, each of which uses different protocol and communication scheme, should be invented. However, most researches related on a hand-off are focused on sync acquisition which is indispensable in case of a hand-off from the asynchronous to the synchronous system, as aforementioned.

Furthermore, although a sync acquisition problem is solved, protocol mismatch caused from different service protocols adopted by the two different systems should be also resolved.

SUMMARY OF THE INVENTION

It is an object of the present invention to provide a method of conducting properly a hand-off of a dual-mode mobile terminal based on terminal capability and communication status to guarantee continuous mobility between a synchronous and an asynchronous communication network system.

A method of supporting hand-off decision of a mobile terminal to guarantee mobility between different mobile communication network systems according to the present invention, includes the steps of: transmitting information of terminal capability operable in both the synchronous and the asynchronous network system to a mixed communication network where the synchronous and the asynchronous network system coexist, irrespective of which network system a present service area belongs to, at the side of the dual-mode terminal; and constructing information on adjacent cells, which are selectively included based on the received terminal capability information, of the dual-mode terminal, and providing the dual-mode terminal with the constructed adjacent cell information, at the side of the mixed communication network.

Another method of supporting hand-off decision of a mobile terminal to guarantee mobility between different mobile communication network systems according to the present invention, includes the steps of: transmitting information on terminal capability operable in both the synchronous and the asynchronous network system to the mixed communication network, irrespective of which network system a present service area belongs to, at the side of the dual-mode terminal; and checking, based on the received terminal capability information, whether or not the dual-mode terminal can access the asynchronous or the synchronous network system, and sending information on adjacent cells of the asynchronous or the synchronous network system to the dual-mode terminal, if accessible to the asynchronous or the synchronous system, at the side of a controller installed in the mixed communication network.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

In the drawings:

FIG. 2 depicts a method that a radio network controller (RNC) of an asynchronous network system provides adjacent cell information for a mobile station according to the present invention; and FIG. 3 depicts a method that a base station controller (BSC) of a synchronous system provides adjacent cell information for a mobile station according to the present invention.

DETAILED DESCRIPTION OF THE PREFFERRED EMBODIMENT

Figure 1:
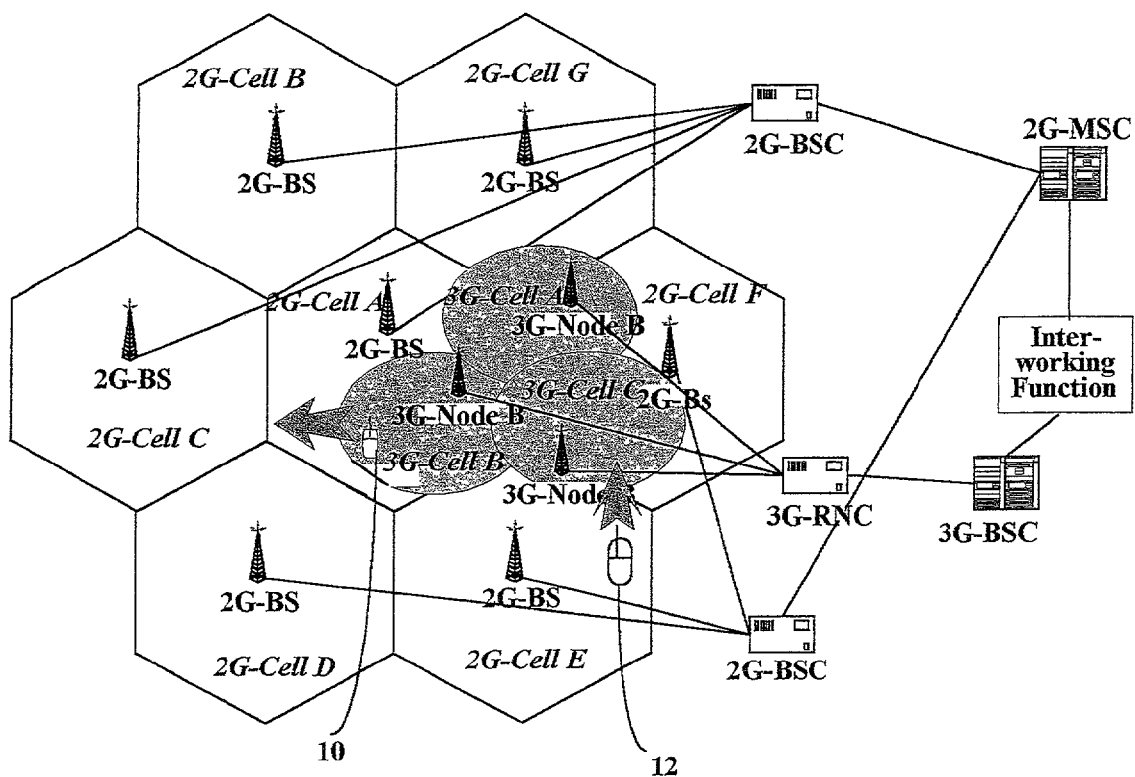
FIG. 1 shows an illustrative partial network to which a method according to the present invention is applied.

In order that the invention may be fully understood, a preferred embodiment thereof will now be described with reference to the accompanying drawings.

FIG. 1 shows an illustrative network to which a method according to the present invention is applied. In the small network of FIG. 1, mobile stations 10 and 12 may be dual-mode ones which can access both a 2G synchronous and a 3G asynchronous network system, or single-mode ones for the asynchronous 3G system only or the synchronous 2G system only according to circumstances.

Supposing the mobile stations 10 and 12 are dual-mode, they have separate two protocol stacks each of which enables data communication with corresponding network system, namely, the synchronous or the asynchronous system. However, they support single network system at an arbitrary point of time. In other words, the mobile stations 10 and 12 drive a protocol stack for the asynchronous system in a service area of the asynchronous system (the 3G mobile communication system) to use asynchronous service, and the other protocol stack for the synchronous system in a service area of the synchronous system (the 2G mobile communication system) to use synchronous service.

In the meantime, the 3G asynchronous network system will be constructed step by step. Therefore, the newly-constructed service areas by the asynchronous system will be naturally covered by the existing synchronous mobile communication system (the 2G one) too as shown in FIG. 1.

In the illustrative network of FIG. 1, the mobile station 10 is located in a cell 'B' of the 3G system at present, thus it selects an asynchronous IMT-2000 system at a system selecting step and runs corresponding asynchronous protocol stack. The other mobile station 12 is located in a cell 'E' of the 2G system now, thus it chooses a synchronous system at a system selecting step and runs the synchronous protocol stack.

When the mobile station 10 moves in the arrow direction, the service area will be changed from the asynchronous system of the 3G IMT-2000 to the synchronous system, so that the mobile station 10 should be handed-off from the asynchronous to the synchronous between different mobile communication systems. To conduct hand-off, information of adjacent cells of the 2G network system should be delivered to the mobile station 10 from a radio network controller (RNC) of the 3G network system. In the asynchronous communication network system, a 'system information message' defines adjacent cell information.

For the mobile station 12, information of adjacent cells of the 3G network system should be sent to the mobile station 12 from a base station controller (BSC) of the 2G network system.

In a single network system, a hand-off is conducted after power measurement is accomplished for each adjacent cell based on the adjacent cell information and then a cell to hand-off to is determined. However, in the communication environment where a plurality of mutually different network systems coexist, it should be determined first whether or not a hand-off is possible because there are various mobile stations for different network systems. Namely, supposing the mobile station 12 is for the 2G system only, the BSC of the 2G system should conduct a hand-off to its own cell 'F' instead of a hand-off between mutually different systems. In addition, supposing the mobile station 10 is for the IMT-2000 asynchronous network system only, it is not necessary to conduct a hand-off to the cell 'A' of the 2G system.

Therefore, it is needed to determine whether to hand off to other network system before conducting a hand-off in a mixed network including both the synchronous and the asynchronous system. For this determination, the mixed network should know terminal capability of a mobile station. If the mixed network knows terminal capability of a mobile station in advance, it can provide the mobile station with adjacent cell information selectively, which will reduce a signal load on system resources by preventing unnecessary hand-off trials.

A method for delivering terminal capability to a communication network is different in the 3G asynchronous system from that of the 2G synchronous system. In the synchronous system, protocol revision number 'MS_P_REV' included in an originating message is transmitted to notify the communication network of entire supportable capability of a mobile station. Then, the service to provide or use is negotiated through a service option negotiation procedure.

In the IMT-2000 asynchronous system, a mobile station delivers information of its supportable service capability to a communication network through an UE capability message. Therefore, a dual-mode mobile station should send combined information related with terminal capability for two different systems to the mixed network in order to conduct a proper hand-off between different network systems. For delivery of combined terminal capability information, if a dual-mode mobile station is located in a synchronous 2G network system, it inserts information of terminal capability to be interpreted by the 3G system in a 2G message, e.g., an originating message in order to prepare possible movement into a cell of the 3G asynchronous system. In the same manner, if a dual-mode mobile station is in the asynchronous 3G system, it inserts a protocol revision number 'MS_P_REV' defined for the 2G system in the UE capability message in order to prepare possible movement into the synchronous 2G system.

FIGS. 2 and 3 show flow charts describing adjacent cell information delivering procedures in which it is determined, based on the combined information, whether to conduct a hand-off between different network systems and a hand-off is conducted.

FIG. 2 depicts a method that an RNC of 3G system provides adjacent cell information to a mobile station, and FIG. 3 depicts a method that a BSC of 2G system provides adjacent cell information to a mobile station.

According to the procedure of FIG. 2, the 3G RNC receives terminal capability information related with functions and service accessibility from a mobile station ('YES' at step S10), then, it stores the received information (step S12). Since the mobile station is dual mode, the terminal capability information received by the 3G RNC is combined so that it includes the 'protocol revision number' which is required for the synchronous 2G network system. If the 3G RNC does not receive terminal capability information from a mobile station, the step S12 would be bypassed.

The 3G RNC determines, based on present location of the mobile station within a cell, whether it is needed to hand-off the mobile station (step S14), if hand-off is necessary ('YES' at step S14) the 3G RNC examines the stored terminal capability information to know whether the corresponding mobile station is able to access the synchronous 2G network system (step S16).

If the stored information is indicative of accessibility of 2G system ('YES' at step S16), the 3G RNC inserts information of 2G adjacent cells, which is formatted in synchronous 2G system, to an adjacent cell list (step S18), packs the adjacent cell list into a system parameter message, and sends the system parameter message to the mobile station (step S30).

If it is decided that the stored information is indicative of non-accessibility of 2G system at the step S16, the 3G RNC skips the step S18 inserting adjacent cell information, and advances to the step S20 directly, so that an adjacent cell list not including 2G adjacent cell information is delivered to the mobile station.

According to the procedure of FIG. 3, the 2G BSC receives terminal capability information related with functions and service accessibility from a mobile station ('YES' at step S30), then, it stores the received information temporally (step S32). Supposing the mobile station is dual mode, the terminal capability information received by the 2G BSC would include the 'UE capability' information which is required for the asynchronous 3G network system. If the 2G BSC does not receive terminal capability information from a mobile station, the step S32 is skipped.

The 2G BSC determines, based on present location of the mobile station within its cell, whether it is needed to hand-off the mobile station (step S14) now, if a hand-off is necessary ('YES' at step S34) the 2G BSC examines the temporally stored terminal capability information to know whether the corresponding mobile station is capable of accessing the asynchronous 3G network system (step S36).

If the stored information is indicative of accessibility of 3G system ('YES' at step S36), the 2G BSC inserts 3G adjacent cell information, which is formatted in asynchronous 3G system, to an adjacent cell list (step S38), packs the adjacent cell list into a neighboring cell list message, and sends the message to the mobile station (step S40).

If it is decided that the stored information is indicative of non-accessibility of 3G system at the step S36, the 2G BSC skips the step S38 inserting 3G-formatted adjacent cell information and advances to the step S40 directly. In this case, an adjacent cell list not including 3G adjacent cell information is delivered to the mobile station.

The method of supporting hand-off decision for guaranteeing mobility of a dual-mode terminal in a mixed mobile network according to the present invention, can guarantee proper hand-off of a dual-mode terminal between a synchronous and an asynchronous network system, prevent unnecessary delivery of adjacent cell list information, furthermore, reduce message load on system resources at the hand-off process which is conducted when a dual-mode terminal being operative in a synchronous network is about to enter an asynchronous network service area.

In addition, the above-explained method according to the present invention can be applied to selection of a base station to hand off to in a forward hand-off process which will be considered henceforth.

The invention may be embodied in other specific forms without departing from the sprit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method of supporting hand-off determination for guaranteeing mobility of a dual-mode terminal in a mixed communication network in which a synchronous and an asynchronous network system coexist, the dual-mode terminal being capable of accessing both the synchronous and the asynchronous network system, comprising the steps of:

(a) transmitting information of terminal capability operable in both the synchronous and the asynchronous network system to the mixed communication network, irrespective of which network system a present service area belongs to, at the side of the dual-mode terminal; and (b) constructing information on adjacent cells, which are selectively included based on the received terminal capability information, of the dual-mode terminal, and providing the dual-mode terminal with the constructed adjacent cell information, at the side of the mixed communication network;

wherein said step (a) inserts information of terminal capability operable in the asynchronous network system in an originating message including a protocol revision number, if the dual-mode terminal is operative in service area of the synchronous network system; and wherein, in said step (b), a controller installed in the synchronous network system checks, based on the received terminal capability information, whether or not the dual-mode terminal can access the asynchronous network system, and sends the information on adjacent cells of the asynchronous network system to the dual-mode terminal, if accessible.

2. The method set forth in claim 1, wherein the adjacent cell information of the asynchronous network system is inserted in an adjacent cell list, the adjacent cell list being carried to the dual-mode terminal through a neighboring cell list message by the controller.

3. The method set forth in claim 1, wherein said step (a) inserts a protocol revision number, which is necessary to be operable in the synchronous network system, in a terminal capability message, if the dual-mode terminal is operative in service area of the asynchronous network system.

4. The method set forth in claim 3, wherein, in said step (b), a controller installed in the asynchronous network system checks, based on the received terminal capability information, whether or not the dual-mode terminal can access the synchronous network system, and sends the information on adjacent cells of the synchronous network system to the dual-mode terminal if accessible.

5. The method set forth in claim 4, wherein the adjacent cell information of the synchronous network system is inserted in an adjacent cell list, the adjacent cell list being carried to the dual-mode terminal through a system parameter message by the controller.

6. A method of supporting hand-off determination for guaranteeing mobility of a dual-mode terminal in a mixed communication network in which synchronous and asynchronous service areas are overlapped, the dual-mode terminal being capable of accessing both a synchronous and an asynchronous network system, comprising the steps of:
  (a) transmitting information on terminal capability operable in the synchronous and the asynchronous network system to the mixed communication network, irrespective of which network system a present service area belongs to, at the side of the dual-mode terminal;
  (b) checking, based on the received terminal capability information, whether or not the dual-mode terminal can access the asynchronous network system, and sending information of adjacent cells of the asynchronous network system to the dual-mode terminal if accessible, at the side of a first controller installed in the synchronous network system checks; and
  (c) checking, based on the received terminal capability information, whether or not the dual-mode terminal can access the synchronous network system, and sending information on adjacent cells of the synchronous network system to the dual-mode terminal if accessible, at the side of a second controller installed in the asynchronous network system.

7. The method set forth in claim 6, wherein said step (a) inserts information of terminal capability operable in the asynchronous network system in an originating message including a protocol revision number, if the dual-mode terminal is operative in service area of the synchronous network system.

8. The method set forth in claim 6, wherein said step (b) inserts the information on adjacent cells of the asynchronous network system in an adjacent cell list, the adjacent cell list being carried to the dual-mode terminal through a neighboring cell list message by the first controller.

9. The method set forth in claim 6, wherein said step (a) inserts a protocol revision number, which is necessary to be operable in the synchronous network system, in a terminal capability message, if the dual-mode terminal is operative in service area of the asynchronous network system.

10. The method set forth in claim 6, wherein said step (c) inserts the information on adjacent cells of the synchronous network system in an adjacent cell list, the adjacent cell list being carried to the dual-mode terminal through a system parameter message by the second controller.

11. A method of supporting hand-off determination for guaranteeing mobility of a dual-mode terminal in a mixed communication network in which a synchronous and an asynchronous network system coexist, the dual-mode terminal being capable of accessing both the synchronous and the asynchronous network system, comprising the steps of:
  (a) transmitting information of terminal capability operable in both the synchronous and the asynchronous network system to the mixed communication network, irrespective of which network system a present service area belongs to, at the side of the dual-mode terminal; and
  (b) constructing information on adjacent cells, which are selectively included based on the received terminal capability information, of the dual-mode terminal, and providing the dual-mode terminal with the constructed adjacent cell information, at the side of the mixed communication network;
  wherein said step (a) inserts a protocol revision number, which is necessary to be operable in the synchronous network system, in a terminal capability message, if the dual-mode terminal is operative in service area of the asynchronous network system; and
  wherein, in said step (b), a controller installed in the asynchronous network system checks, based on the received terminal capability information, whether or not the dual-mode terminal can access the synchronous network system, and sends the information on adjacent cells of the synchronous network system to the dual-mode terminal if accessible.

12. The method set forth in claim 11, wherein said step (a) inserts information of terminal capability operable in the asynchronous network system in an originating message including a protocol revision number, if the dual-mode terminal is operative in service area of the synchronous network system.

13. The method set forth in claim 12, wherein, in said step (b), a controller installed in the synchronous network system checks, based on the received terminal capability information, whether or not the dual-mode terminal can access the asynchronous network system, and sends the information on adjacent cells of the asynchronous network system to the dual-mode terminal, if accessible.

14. The method set forth in claim 13, wherein the adjacent cell information of the asynchronous network system is inserted in an adjacent cell list, the adjacent cell list being carried to the dual-mode terminal through a neighboring cell list message by the controller.

15. The method set forth in claim 11, wherein the adjacent cell information of the synchronous network system is inserted in an adjacent cell list, the adjacent cell list being carried to the dual-mode terminal through a system parameter message by the controller.

* * * * *